(12) United States Patent
Nakamura et al.

(10) Patent No.: US 6,513,469 B2
(45) Date of Patent: Feb. 4, 2003

(54) VARIABLE VALVE OPERATING SYSTEM OF INTERNAL COMBUSTION ENGINE

(75) Inventors: Makoto Nakamura, Kanagawa (JP); Naoki Okamoto, Kanagawa (JP); Shinichi Takemura, Kanagawa (JP)

(73) Assignees: Unisia Jecs Corporation, Atsugi (JP); Nissan Motor Co., Ltd., Yokohama (JP)

(*) Notice: Subject to any disclaimer, the term of this patent is extended or adjusted under 35 U.S.C. 154(b) by 0 days.

(21) Appl. No.: 10/093,512

(22) Filed: Mar. 11, 2002

(65) Prior Publication Data

US 2002/0088416 A1 Jul. 11, 2002

Related U.S. Application Data

(62) Division of application No. 09/647,660, filed as application No. PCT/JP00/00802 on Feb. 15, 2000.

(30) Foreign Application Priority Data

Feb. 15, 1999 (JP) .............................................. 11-35117

(51) Int. Cl.$^7$ .................................................. F01L 1/34
(52) U.S. Cl. ................................ 123/90.15; 123/90.16; 123/90.17
(58) Field of Search ........................... 123/90.15, 90.16, 123/90.17, 90.27, 90.31, 90.39, 90.6, 198 D

(56) References Cited

U.S. PATENT DOCUMENTS

| | | | | |
|---|---|---|---|---|
| 5,024,191 A | * | 6/1991 | Nagahiro et al. | 123/198 D |
| 5,803,029 A | * | 9/1998 | Yoshihara et al. | 123/90.15 |
| 6,196,197 B1 | * | 3/2001 | Yamada et al. | 123/480 |

FOREIGN PATENT DOCUMENTS

| | | | | |
|---|---|---|---|---|
| JP | 360150409 | * | 8/1985 | 123/90.15 |
| JP | 03-99860 | | 10/1991 | |
| JP | 04-287809 | | 10/1992 | |
| JP | 05-52240 | | 7/1993 | |
| JP | 5-87643 | | 12/1993 | |
| JP | 06-42379 | | 2/1994 | |
| JP | 07-109934 | | 4/1995 | |
| JP | 07-180513 | | 7/1995 | |
| JP | 07-247815 | | 9/1995 | |
| JP | 08-177432 | | 7/1996 | |
| JP | 08-177433 | | 7/1996 | |
| JP | 08-177434 | | 7/1996 | |
| JP | 08-177436 | | 7/1996 | |
| JP | 09-268906 | | 10/1997 | |
| JP | 2000-110528 | | 4/2000 | |
| JP | 2000-130196 | | 5/2000 | |

* cited by examiner

Primary Examiner—Thomas Denion
Assistant Examiner—Jaime Corrigan
(74) Attorney, Agent, or Firm—Foley & Lardner

(57) ABSTRACT

A variable valve operating system of an internal combustion engine includes a first variable mechanism capable of variably controlling a lift characteristic of an intake valve, and a second variable mechanism capable of variably controlling a valve-open and/or valve-close timing characteristic of the intake valve. A position detector detects current actual positions of the first and second variable mechanisms. A controller responds to a detected failure position of one of the first or second variable mechanisms by controlling movement of the other of the variable mechanisms within a predetermined range that avoids interference between the engine valve and a piston and between the intake and exhaust valves when the one variable mechanism fails.

15 Claims, 11 Drawing Sheets

VARIABLE VALVE OPERATING SYSTEM OF INTERNAL COMBUSTION ENGINE

This is a Divisional Application of application Ser. No. 09/647,660, filed Oct. 4, 2000, which is National Stage of PCT/JP00/00802, filed Feb. 15, 2000.

TECHNICAL FIELD

The present invention relates to a variable valve operating system equipped with a first variable mechanism capable of controlling lift characteristics of an engine valve such as an intake valve or an exhaust valve, and second variable mechanism capable of controlling a valve-open and/or valve-close timing.

BACKGROUND ART

As is generally known, there have been proposed and developed various variable valve operating systems that can enhance an engine operating performance by enhancing a degree of freedom of valve operating characteristics by way of a combination of a variable lift mechanism capable of variably adjusting a valve lift characteristic of an intake valve and a variable valve timing mechanism capable of variably adjusting valve-open and/or valve-close timing characteristics.

However, in such conventional variable valve operating systems, there were insufficient studies of a measure to counter in case at least one of the variable lift mechanism and the variable valve timing mechanism fails with an internal combustion engine in operation, thereby causing several problems, that is, mechanical problems such as the interference between at least two of a piston, an intake valve, and an exhaust valve, in particular a problem of remarkably reduced engine performance.

That is to say, in variable valve operating systems disclosed in Japanese Patent Provisional Publication No. 4-287809 and Japanese Utility Model Provisional Publication No. 3-99860, a variable lift mechanism and a variable valve timing mechanism both use hydraulic pressure as an energy source. Therefore, in presence of a hydraulic system failure, for example, in presence of a failure in an electromagnetic switching valve disposed in the middle of a hydraulic circuit or in presence of a failure in a hydraulic equipment included in a hydraulic pressure control system, a malfunction of the variable lift mechanism and a malfunction of the variable valve timing mechanism occur. In this case, it is difficult to variably control both of a valve lift and a valve timing. As a result of this, it is impossible to produce a sufficient engine performance, and also there is a possibility of remarkably reduced engine performance due to particular engine operating conditions.

Additionally, even when a hydraulic system failure does not occur, owing to a high viscosity resistance at low oil temperature conditions such as during an engine start-up period, it is difficult to insure a satisfactory operation of each of the variable lift mechanism and the variable valve timing mechanism. Due to the high viscosity resistance as well as a long length of a hydraulic pressure passage, a delay in hydraulic pressure supply from a hydraulic pump to each of the variable lift mechanism and the variable valve timing mechanism occurs. Owing to such a system malfunction, there is a technical problem of a reduced control response for each of the variable lift mechanism and the variable valve timing mechanism to a change in the engine operating condition for a while after starting.

As an additional prior art, Japanese Patent Provisional Publication No. 8-177434 also discloses a variable valve operating system.

Roughly speaking, the previously-noted variable valve operating system is equipped with a valve lift control mechanism capable of variably controlling a cam lift of an intake valve (serving as an engine valve) or a cam lift of an exhaust valve (serving as an engine valve) by selectively switching from one of a low-speed cam and a high-speed cam (both provided on a camshaft) to the other depending on engine operating conditions, and a valve timing control mechanism capable of variably controlling a valve-open and/or valve-close timing by changing a relative angular phase between the camshaft and a crankshaft depending on the engine operating conditions.

Additionally, the above-mentioned system is also equipped with a control mechanism provided to avoid the interference between the intake valve and the exhaust valve by forcibly switching to the low-speed cam by means of the valve-lift control mechanism in presence of a failure in the previously-noted valve timing control mechanism, or by controlling the valve-open and/or valve-close timing of the engine valve by means of the valve timing control mechanism so that a center of operation of a valve lift moves away from a top dead center in presence of a failure in the previously-noted valve lift control mechanism.

In the aforementioned variable valve operating system, as discussed above, it is possible to avoid the mechanical problem such as the interference between the intake valve and the exhaust valve in presence of a failure in each of the valve lift control mechanism and the valve timing control mechanism. However, in case either one of the control mechanisms fails, the system functions to forcibly switch to the low-speed cam by means of the valve lift control mechanism or to control a valve-open and/or valve-close timing so that the center of operation of a valve lift moves away from the top dead center by virtue of the valve timing control mechanism. As a matter of course, a valve overlap through which both the intake and exhaust valves are open together becomes reduced. Therefore, in a high engine-speed operating range, the engine power output tends to reduce, and thus it is difficult to produce a satisfactory engine performance.

DISCLOSURE OF THE INVENTION

In order to accomplish the aforementioned and other objects, according to the invention as claimed in claim 1, a variable valve operating system of an internal combustion engine comprises a first variable mechanism capable of variably controlling at least a lift characteristic of an engine valve depending on an engine operating condition, and a second variable mechanism capable of variably controlling at least a valve-open and/or valve-close timing characteristic of the engine valve depending on the engine operating condition, characterized in that the first variable mechanism is driven by an electric actuator, whereas the second variable mechanism is driven by hydraulic pressure of working fluid, and in that the system inhibits the second variable mechanism from being driven and allows only the first variable mechanism to be driven within an operating range from engine start operation to a time when a temperature of the working fluid reaches a predetermined temperature value, and the system allows both the first and second variable mechanisms to be driven from a time when the temperature of the working fluid exceeds the predetermined temperature value.

In accordance with the previously-noted invention, a power source of the first variable mechanism is different from a power source of the second variable mechanism.

Except the engine starting period, even in case either one of an electric system and a hydraulic system failsi the other variable mechanism cannot be affected, and thus at least one variable mechanism can be driven normally. Therefore, it is possible to prevent the engine performance from lowering. Furthermore, during the engine starting period a valve lift is generally adjusted to a small amount, and therefore there is no problem of the previously-discussed interference even in presence of the system failure.

Additionally, even when both the variable mechanisms are driven, actuation of the second variable mechanism, using hydraulic pressure as a power source, is inhibited during the engine starting period, and is allowed from the time when the temperature of working fluid reaches the predetermined temperature value. Thus, for a while from the engine starting, it is possible to enhance. various engine performances, such as a startability, owing to high-response lift control of the first variable mechanism. Additionally, after a rise in the temperature of working fluid, it is possible to largely enhance the engine performances by way of a combination of both the first and second variable mechanisms.

According to the invention as claimed in claim 2, a valve lift of the engine valve is controlled to a minimum lift substantially corresponding to a substantially zero-lift position during engine cranking corresponding to an initial stage of engine starting, and then the valve lift of the engine valve is variably controlled so that the valve lift increases according to a rise in engine speed.

Therefore, during the engine cranking corresponding to the initial stage of engine starting, the hydraulic-pressure driven second variable mechanism cannot be driven, and in lieu thereof the valve lift of the engine valve can be controlled to the minimum lift substantially corresponding to a substantially zerolift position by means of the first variable mechanism. Thus, it is possible to provide a smooth engine-speed rise characteristic. Further, the valve lift tends to increase according to a rise in engine speed, thereby enhancing a gas exchange efficiency, and consequently insuring a good-startability.

According to the invention as claimed in claim 3, the above-mentioned first variable mechanism comprises a drive shaft having a drive cam formed on an outer periphery thereof, and an oscillating cam being oscillatingly supported on a pivot and acting to open and close the engine valve by way of oscillating motion thereof, and a rocker arm rotatably linked at one end to the drive cam and rotatably linked at the other end to the oscillating cam, and a center of the oscillating motion of the rocker arm being variably controlled by means of a control cam.

In accordance with the previously-noted invention, the valve lift can be continuously varied by rotating the control cam, and additionally it is possible to set a variable width of valve lift to a greater value. The system of the invention can provide a sufficient engine performance even in presence of a failure in each of the variable mechanisms as well as in absence of the failure in each of the variable mechanisms.

Additionally, owing to the use of the control cam, a phase of the valve lift uniquely changes according to a change in the valve lift, but the second variable mechanism, capable of varying the phase of the drive shaft, is combined with the first variable mechanism, and thus it is possible to correct the previously-noted unique changes in the phase of the valve lift. As a result of this, it is possible to provide a satisfactory engine performance in the absence of the failure in each of the variable mechanisms.

According to the invention as claimed in claim 4, the first variable mechanism comprises a drive shaft having a drive cam formed on an outer periphery thereof, and an axis of the drive cam being eccentric to an axis of the drive shaft, a link arm rotatably at one end linked to an outer periphery of the drive cam, a rocker arm rotatably linked at one end to the other end of the link arm, and a center of oscillating motion being variably controlled by means of a control cam, an oscillating cam acting to open and close the engine valve, a link member mechanically and rotatably linking the oscillating cam to the other end of the rocker arm, and an electric actuator controlling a rotational position of the control cam by rotating the control cam by means of a control shaft responsively to the engine operating condition.

In accordance with the previously-noted invention, by means of the link member, it is possible to limit a maximum range of oscillating motion of the oscillating cam within. a range of oscillating motion of the rocker arm. Thus, even in a high engine speed range, it is possible to certainly prevent a jumping phenomena, such as excessive oscillation and excessive jumping motion. Therefore, it is possible to avoid collision between the oscillating cam and the rocker arm, occurring due to movement of the oscillating cam into and out of contact with the rocker arm, thus preventing occurrence of hammering noise, and also preventing the accuracy of valve-lift control from lowering. In particular, in the high engine speed range, it is possible to stabilize the engine performance.

According to the invention as claimed in claim 5, a variable valve operating system of an internal combustion engine comprises a first variable mechanism capable of variably controlling at least a lift characteristic of an engine valve depending on an engine operating condition, a second variable mechanism capable of variably controlling at least a valve-open and/or valve-close timing characteristic of the engine valve depending on the engine operating condition, a position detection means for detecting a current actuated position of at least one of the first and second variable rimechanisms, and a control means being responsive to a failure position of the at least one of the first and second variable mechanisms, detected by the position detection means, for controlling movement of the other variable mechanism within a predetermined range when the at least one of the first and second variable mechanisms fails.

In accordance with the previously-noted invention, for example, when the first variable mechanism fails in a predetermined engine operating range, the position detection means detects a failure position of first variable mechanism, and then its informational signal is output into the control means, and thereby the control means can control can control the second variable mechanism within the predetermined range capable of avoiding a mechanical interference between engine valves as much as possible, responsively to the failure position of the first variable mechanism. Hitherto, the conventional system functioned to forcibly switch or control to a low-speed cam by means of the first variable mechanism. Therefore, according to the system of the invention, it is possible to insure a satisfactory engine performance depending on the engine operating condition, as much as possible.

According to the invention as claimed in claim 6, a variable valve operating system of an internal combustion engine comprises a first variable mechanism capable of variably controlling at least a lift characteristic of an engine valve depending on an engine operating condition, a second variable mechanism capable of variably controlling at least a valve-open and/or valve-close timing characteristic of the engine valve depending on the engine operating condition, a position detection means for detecting a current actuated position of the second variable mechanism, and a control means being responsive to a failure position of the second variable mechanism, detected by the position detection means, for controlling movement of the first variable mechanism within a predetermined range when the second variable mechanism fails.

According to the invention as claimed in claim 7, a variable valve operating system of an internal combustion engine comprises a first variable mechanism capable of variably controlling at least a lift characteristic of an engine valve depending on an engine operating condition, a second variable mechanism capable of variably controlling at least a valve-open and/or valve-close timing characteristic of the engine valve dependinng on the engine operating condition, a position detection means for detecting a current actuated position of the first variable mechanism, and a control means being responsive to a failure position of the first variable mechanism, detected by the position detection means, for controlling movement of the second variable mechanism within a predetermined range when the first variable mechanism fails.

In accordance with the previously-noted invention as recited in claims 6 and 7, in the same manner as the invention as recited in claim 5, when one of the first and second variable mechanisms fails, by means of the control means it is possible to control the other variable mechanism as much as possible, and continuously or intermittently within a predetermined range capable of avoiding a mechanical interference between an engine valve and a piston and a mechanical interference between an intake valve and an exhaust valve, responsively to the failure position of one variable mechanism. Therefore, it is possible to prevent the engine performance from lowering, while avoiding mechanical problems.

According to the invention as claimed in claim 8, the above-mentioned first variable mechanism comprises a drive shaft having a drive cam formed on an outer periphery thereof, and an oscillating cam being oscillatingly supported on a pivot and acting to open and close the engine valve by way of oscillating motion thereof, and a rocker arm rotatably linked at one end to the drive cam and rotatably linked at the other end to the oscillating cam, and a center of the oscillating motion of the rocker arm being variably controlled by, means of a control cam.

In accordance with the previously-noted invention, the valve lift can be continuously varied by rotating the control cam, and additionally it is possible to set a variable width of valve lift to a greater value. The system of the invention can provide a sufficient engine performance even in presence of a failure in each of the variable mechanisms as well as in absence of the failure in each of the variable mechanisms.

Additionally, owing to the use of the control cam, a phase of the valve lift uniquely changes according to a change in the valve lift, but the second variable mechanism, capable of varying the phase of the drive shaft, is combined with the first variable mechanism, and thus it is possible to correct the previously-noted unique changes in the phase of the valve lift. As a result of this, it is possible to provide a satisfactory engine performance in the absence of the failure in each of the variable mechanisms.

According to the invention as claimed in claim 9, the first variable mechanism comprises a drive shaft having a drive cam formed on an outer periphery thereof, a link arm rotatably at one end linked to an outer periphery of the drive cam, a rocker arm rotatably linked at one end to the other end of the link arm, and a center of oscillating motion being variably controlled by means of a control cam, an oscillating cam acting to open and close the engine valve, a link member mechanically and rotatably linking the oscillating cam to the other end of the rocker arm and limiting a maximum range of oscillating motion of the oscillating cam within a range of oscillating motion of the rocker arm, and an electric actuator controlling a rotational position of the control cam by rotating the control cam by means of a control shaft responsively to the engine operating condition.

In accordance with the previously-noted invention, by means of the link member, it is possible to limit the maximum range of oscillating motion of the oscillating cam within the range of oscillating motion of the rocker arm. Thus, even in a high engine speed range, it is possible to certainly prevent a jumping phenomena, such as excessive oscillation and excessive jumping motion. Therefore, it is possible to avoid collision between the oscillating cam and the rocker arm, occurring due to movement of the oscillating cam into and out of contact with the rocker arm, thus preventing occurrence of hammering noise, and also preventing the accuracy of valve-lift control from lowering. In particular, in the high engine speed range, it is possible to stabilize the engine performance.

DESCRIPTION OF THE PREFERRED EMBODIMENTS

Figure 1:
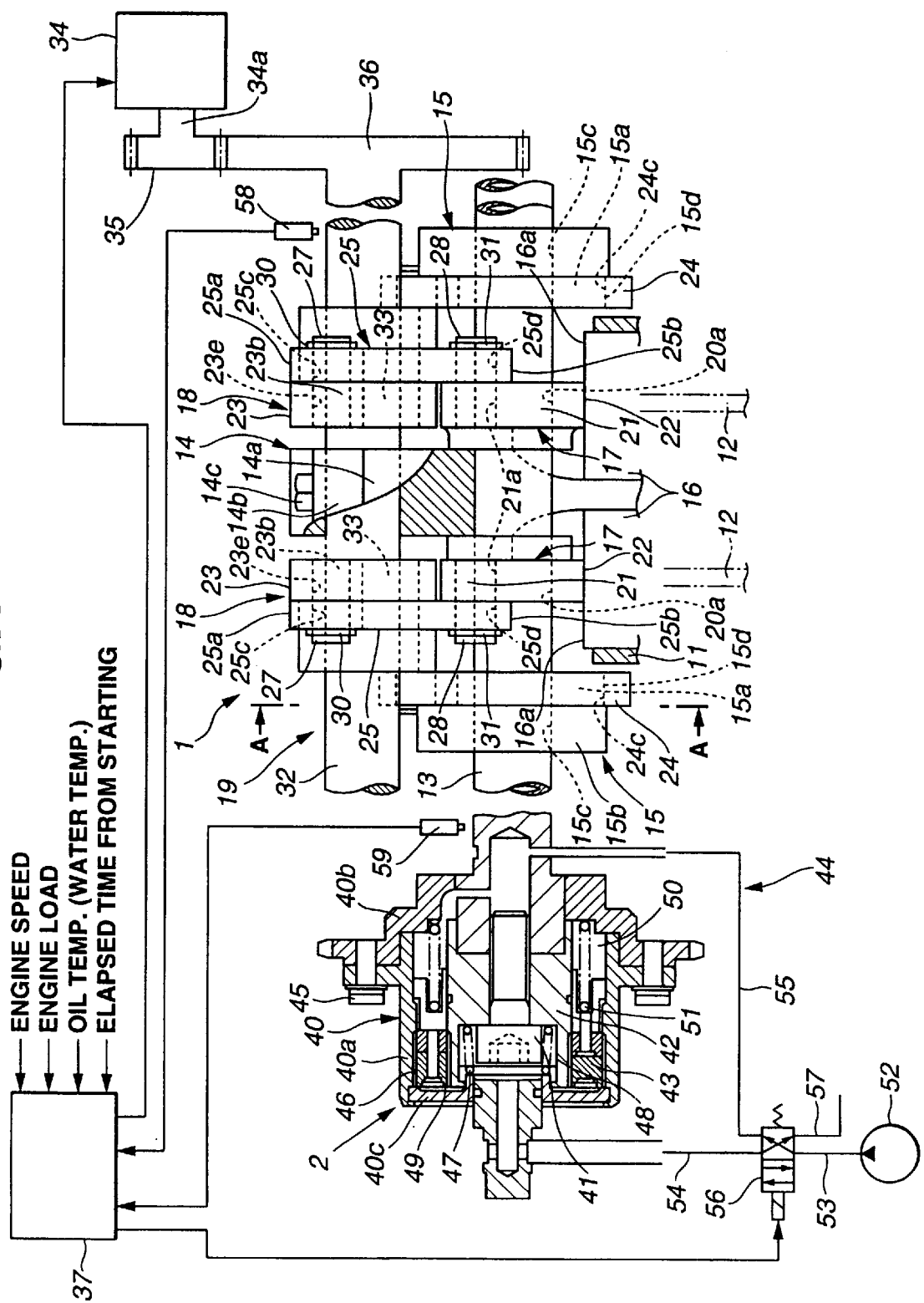
FIG. 1 is a cross-sectional view illustrating one embodiment of a variable valve operating system of the invention.

The present invention will be hereinbelow described in detail in reference to the drawings attached hereto. As shown in FIG. 1, the variable valve operating system of the invention is exemplified in an intake valve side. Two intake valves 12, 12 per engine cylinder are slidably provided on a cylinder head 11 through valve guides (not shown). A first variable mechanism 1 capable of variably controlling a valve lift of each of the intake valves 12, 12 depending on an engine operating condition, and a second variable mechanism 2 capable of variably controlling a valve-open and/or valve-close timing of, each of the intake valves 12, 12 are also provided.

Figure 2:
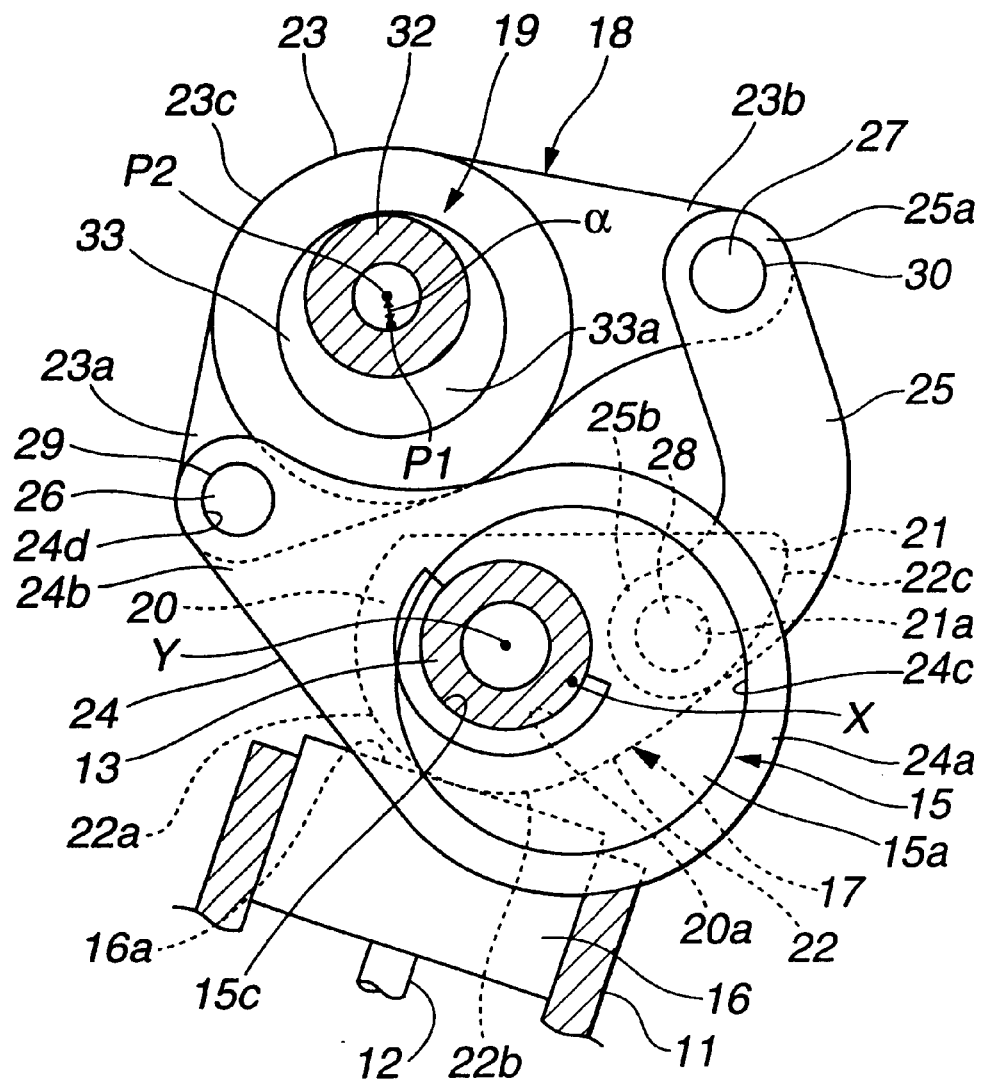
FIG. 2 is a cross-sectional view taken along the line A—A shown in FIG. 1.
Figure 3:
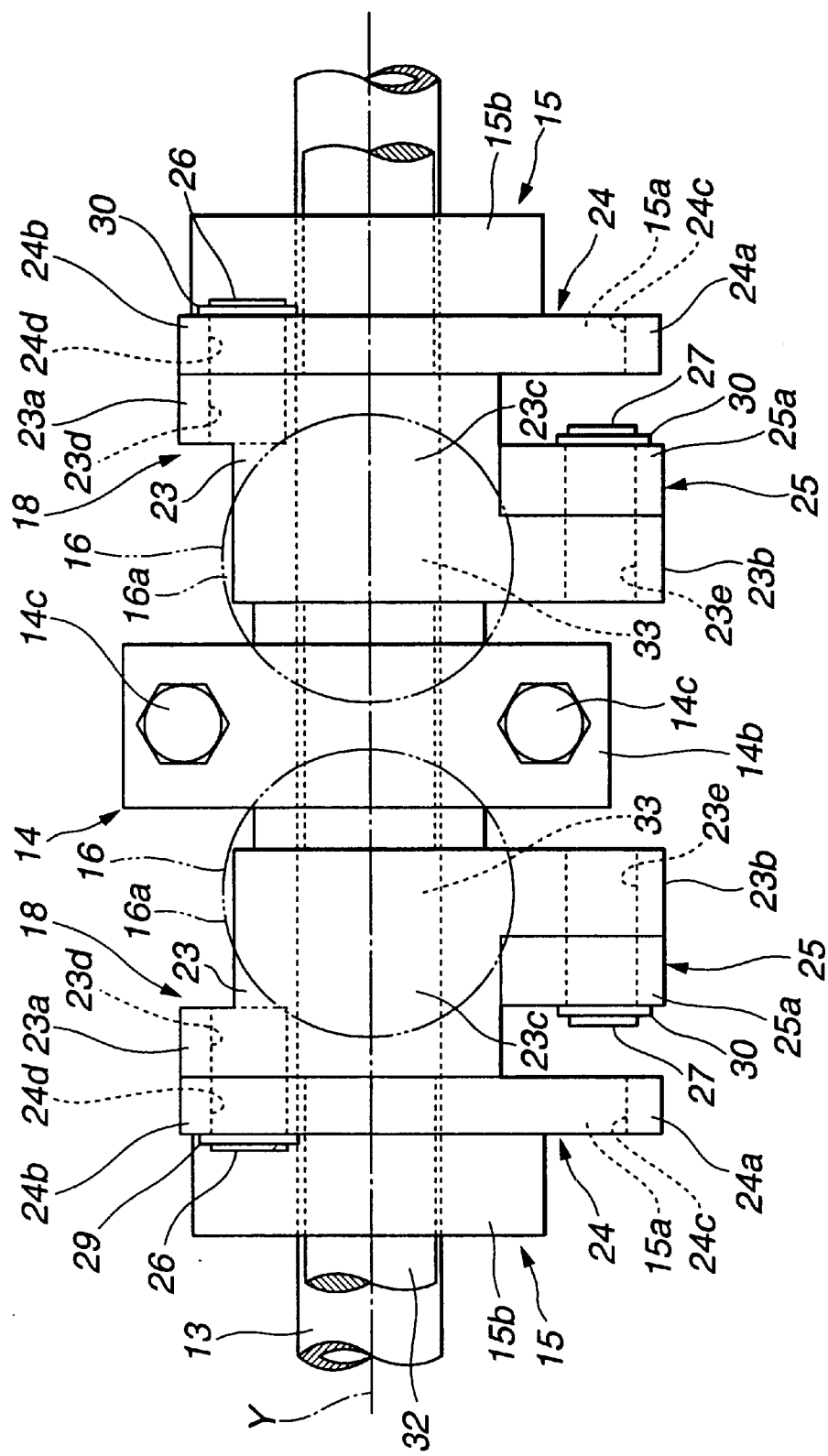
FIG. 3 is a plan view illustrating the first variable mechanism.

As shown in FIGS. 1 through 3, the first variable mechanism 1 includes a hollow drive shaft 13 rotatably supported by means of a bearing 14 provided on the upper portion of the cylinder head 11, two drive cams 15, 15 constructed by eccentric cams fixedly press-fitted to the drive shaft 13, oscillating cams 17, 17 oscillatingly supported on the drive shaft 13 and capable of opening the intake valves 12, 12 by way of movement of the oscillating cams into sliding-contact with respective flat upper faces 16a, 16a of valve lifters 16, 16 provided. at the upper portions of the intake valves 12, 12, a force transmission mechanism 18 linked between each pair of the drive cams 15 and each of the oscillating cams 17, 17, for transmitting a rotational force of the drive cam 15 as an oscillating force of the associated one of the oscillating cams 17, 17, and a control mechanism 19 capable of variably controlling an actuated position of the transmission mechanism 18.

The previously-noted drive shaft 13 is arranged in the longitudinal direction of the engine. A rotational force is transmitted from an engine crankshaft to the drive shaft 13 through a timing chain (not shown) wound on a timing sprocket 40 of the second variable mechanism 2 (which will be fully described later) provided at one end.

As shown in FIG. 1, the bearing 14 is provided on the upper end of the cylinder head 11. The bearing has a main bracket 14a supporting the upper portion of the drive shaft 13, and a sub bracket 14b provided at the upper end of the main bracket 14a to rotatably support a control shaft 32 (which will be hereinafter described in detail). Both of the brackets 14a and 14b are firmly secured each other from the upper part by way of a pair of bolts 14c, 14c.

As shown in FIGS. 1 through 3, both of the drive cams 15 are formed into a ring shape. Each of the drive cams includes a cam body 15a and a cylindrical portion 15b integrally formed on the outside end of the cam body 15a. The drive cam has an axially-extending drive-shaft insertion hole 15c formed therein as a through opening. The axis X of the cam body 15a is offset in the radial direction from the axis Y of the drive shaft 13. Also, each of the drive cams 15 is press-fitted to the drive shaft 13 through the associated drive-shaft insertion hole 15c outside of the valve lifters so that the drive cams never interference with the respective valve lifters 16, 16. Outer peripheral surfaces 15d, 15d of both of the cam bodies 15a, 15a have the same cam profile.

As shown in FIG. 2, the above-mentioned oscillating cams 17 are formed into a substantially U shape in lateral cross section. One end of the oscillating cam is formed as an annular base portion 20. The base portion is formed with a support hole 20a into which the drive shaft 13 is inserted so that the drive shaft is rotatably supported by the support hole. The other end of the oscillating cam is formed as a cam nose portion 21. The cam nose portion is formed with a pin hole 21a. Additionally, the oscillating cam 17 is formed on its lower face with a cam surface 22. The oscillating cam is also formed with a basic-circle surface 22a of the base portion 20, a circular-arc shaped ramp surface 22b extending from the basic-circle surface 22a to the cam nose portion 21, and a lift surface 22c being continuous with the end of the ramp surface 22b. The basic-circle surface 22a, the ramp surface 22b, and the lift surface 22c are designed to be in abutted-contact with a predetermined position of the upper face 16a of the valve lifter 16, depending on the oscillating position of the oscillating cam 17.

As shown in FIG. 2, the transmission mechanism 18 includes a rocker arm 23 arranged above the drive shaft 13, a link arm 24 linking one end 23a of the rocker arm and the drive cam 15, and a link rod 25 serving as a link member mechanically linking the other end 23b of the rocker arm 23 and the oscillating cam 17.

As shown in FIG. 3, each of the rocker arms 23 is bent or formed into a substantially crank shape, as seen from a plan view. A cylindrical base portion 23c formed at the center of the crank-shaped rocker arm is rotatably supported by a control cam 33 which will be fully described later. As seen from FIGS. 2 and 3, the previously-noted one end 23a projected from each outside end of the respective base portion 23c is formed with a pin hole 23d (a through opening) into which a pin 26 is inserted. The pin is connected to the link arm 24 in such a manner as to be rotatable relative to the link arm. On the other hand, the previously-noted other end 23b projected from each inside end of the respective base portion 23c is formed with a pin hole 23e (a through opening) into which a pin 27 is inserted. The pin is connected to the link rod 25 in such a manner as to be rotatable relative to one end 25a of the link rod 25.

Also, the previously-noted link arm 24 includes a comparatively large-diameter, annular base portion 24a, and a projected end 24b projecting from a predetermined position of the outer peripheral surface of the base portion 24a. The base portion 24a is also formed at its center with a loose-fit hole 24c rotatably fitted onto the outer peripheral surface of the cam body 15a of the drive cam 15, whereas the projected end 24b is formed with a pin hole 24d (a through opening) into which the pin 26 is inserted so that the pin is rotatably supported by the pin hole.

Furthermore, as shown in FIG. 2, the link rod 25 is bent or formed into a substantially L shape of a predetermined length. As shown in FIG. 3, both ends 25a, 25b of the link rod are formed with pin insertion holes 25c, 25d, respectively. The ends of the pins 27 and 28, inserted into the pin hole 23e formed in the other end 23b of the rocker arm 23 and the pin hole 21a formed in the cam nose portion 21 of the oscillating cam 17, are rotatably inserted into the respective pin insertion holes 25c and 25d.

The above-mentioned link rod 25 is designed to limit the maximum range of oscillating motion of the oscillating cam 17 within the oscillating-motion range of the rocker arm 23.

Snap rings 29, 30, and 31 are attached to ends of the respective pins 26, 27, and 28, for restricting axial movement of the link arm 24 and axial movement of the link rod 25.

The previously-noted control mechanism 19 is constructed by the control shaft 32 arranged in the longitudinal direction of the engine, the control cam 33 fixed onto the outer periphery of the control shaft 32 and serving as a fulcrum for oscillating motion of the rocker arm 23, and an electric motor 34 serving as an electric actuator capable of controlling the rotational position of the control shaft 32.

The above-mentioned control shaft 32 is arranged parallel to the drive shaft 13. As discussed above, the control shaft is rotatably supported between a bearing groove of the upper end of the main bracket 14a of the bearing 14 and the sub bracket 14b. On the other hand, each of the control cams 33 is cylindrical in shape. As shown in FIG. 2, the axis P1 of the control cam is deviated from the axis P2 of the control shaft 32 by an eccentric distance e.

The previously-noted electric motor 34 is designed to transmit a rotational force to the control shaft 32 through a first spur gear 35 (mounted on the extremity of a drive shaft 34a) and a second spur gear 36 (mounted on the rear end of the control shaft 32) in meshed-engagement with each other. The electric motor is driven by a control signal from a controller 37 which detects engine operating conditions.

On the other hand, as shown in FIG. 1, the previously-noted second variable mechanism 2 is provided at the extremity of the drive shaft 13. The second variable mechanism is constructed by the timing sprocket 40 to which the rotational force is transmitted from the engine crankshaft via the timing chain (not shown), a sleeve 42 fixedly connected to the extremity of the drive shaft 13 by bolts 41 from the axial direction, a cylindrical ring gear 43 interleaved between the timing sprocket 40 and the sleeve 42, and a hydraulic circuit 44 serving as a drive mechanism capable of driving the cylindrical ring gear 43 in the axial direction of the drive shaft 13.

The above-mentioned timing sprocket 40 includes a cylindrical body 40a, a sprocket portion 40b, and a front cover. The sprocket portion, on which the timing chain is wound, is fixed to the rear end of the cylindrical body by means of bolts 45. The front opening of the cylindrical body 40a is closed by the front cover 40c. Inner helical gear 46 is formed on the inner peripheral surface of the cylindrical body 40a.

The above-mentioned sleeve 42 is formed at its rear end with a fitting groove into which the extremity of the drive shaft 13 is fit. A coil spring 47 is disposed in a holding groove of the front end of the sleeve for forwardly biasing the timing sprocket 40 through the front cover 40c. Additionally, outer helical gear 48 is formed on the outer peripheral surface of the sleeve 42.

The previously-noted ring gear 43 is divided into two parts, namely front and rear gear component parts, in a direction perpendicular to the axial direction. The front and rear gear component parts are biased to each other by means of pins and springs, so that the two component parts move towards each other. Additionally, the ring gear is formed at its inner peripheral surface with an inner helical toothed portion in meshed-engagement with the outer helical gear 48 and with an outer helical toothed portion in meshed-engagement with the inner helical gear 46. First and second hydraulic pressure chambers 49 and 50 are defined in front and in rear of the ring gear. The ring gear is designed to move in the longitudinal direction while being in sliding-contact with the rspective inner and outer gears, by way of hydraulic pressure supplied relatively into the first and second hydraulic pressure chambers. Additionally, the ring gear 43 is designed to control the intake valve 12 to the maximum timing retard position when the ring gear is positioned at its maximum forward shifting position at which the ring gear is abutted-engagement with the front cover 40c, and designed to control the intake valve to the maximum timing advance position with the ring gear held at its maximum backward shifting position. Furthermore, the ring gear is designed to be biased to the maximum forward shifting position by means of a return spring 51 disposed in the second hydraulic pressure chamber 50 under preload, when there is no supply of hydraulic pressure into the first hydraulic-pressure chamber 49.

The hydraulic circuit 44 is constructed by a main gallery 83 connected to the downstream side of an oil pump 52 communidating an oil pan (not shown), first and second hydraulic pressure passages 54 and 55 branched at the downstream side of the main gallery 53 and respectively connected to the first and second hydraulic pressure chambers 49 and 50, a solenoid-actuated fluid-passage directional control valve 56 provided at the branched position, and a drain passage 57 connected to the fluid-passage directional control valve 56.

The above-mentioned fluid-passage directional control valve 56 is switched and driven by a control signal from the same controller that controls the electric motor 34 of the first variable mechanism 1.

The controller 37 arithmetically calculates or computes a current engine operating condition on the basis of input information signals from various sensors, such as an engine-speed indicative signal from a crank angle sensor, an intake-air quantity indicative signal (an engine-load indicative signal) from an air flow meter, and a signal from an engine oil temperature sensor, and detects and determines the current engine operating condition. Additionally, the controller receives a signal from a first position detection sensor 58 capable of detecting a current rotational position of the control shaft 32 and a signal from a second position detection sensor 59 capable of detecting a relative rotational position of the drive shaft 13 relative to the timing sprocket 40, and outputs control signals respectively to the electric motor 34 and the fluid-passage directional control valve 56 on the basis of the these input information signals from the first and second position detection sensors. In case that either one of the first and second variable mechanisms 1 and 2 fails and is brought into a locking state, the system has a control circuit serving as a control means for variably controlling the other variable mechanism continuously within a predetermined range responsively to the locking position (failure position) of one variable mechanism.

That is today, the controller 37 determines a desired lift characteristic of the intake valve 12, that is, a desired rotational position of the control shaft 32, on the basis of the input information signals, such as engine speed, engine load, oil temperature, and an elapsed time measured from engine start-up. The controller functions to rotate the electric motor 34 in response to a control siresentative of the desired rotational position, and thus the control cam 33 is rotated and controlled to a predetermined rotational position via the control shaft 32. Also, the actual rotational position of the control shaft 32 is monitored by the first position detection sensor 58, so that the control shaft 32 is rotated and brought closer to the desired phase by way of feedback control.

Figure 4:
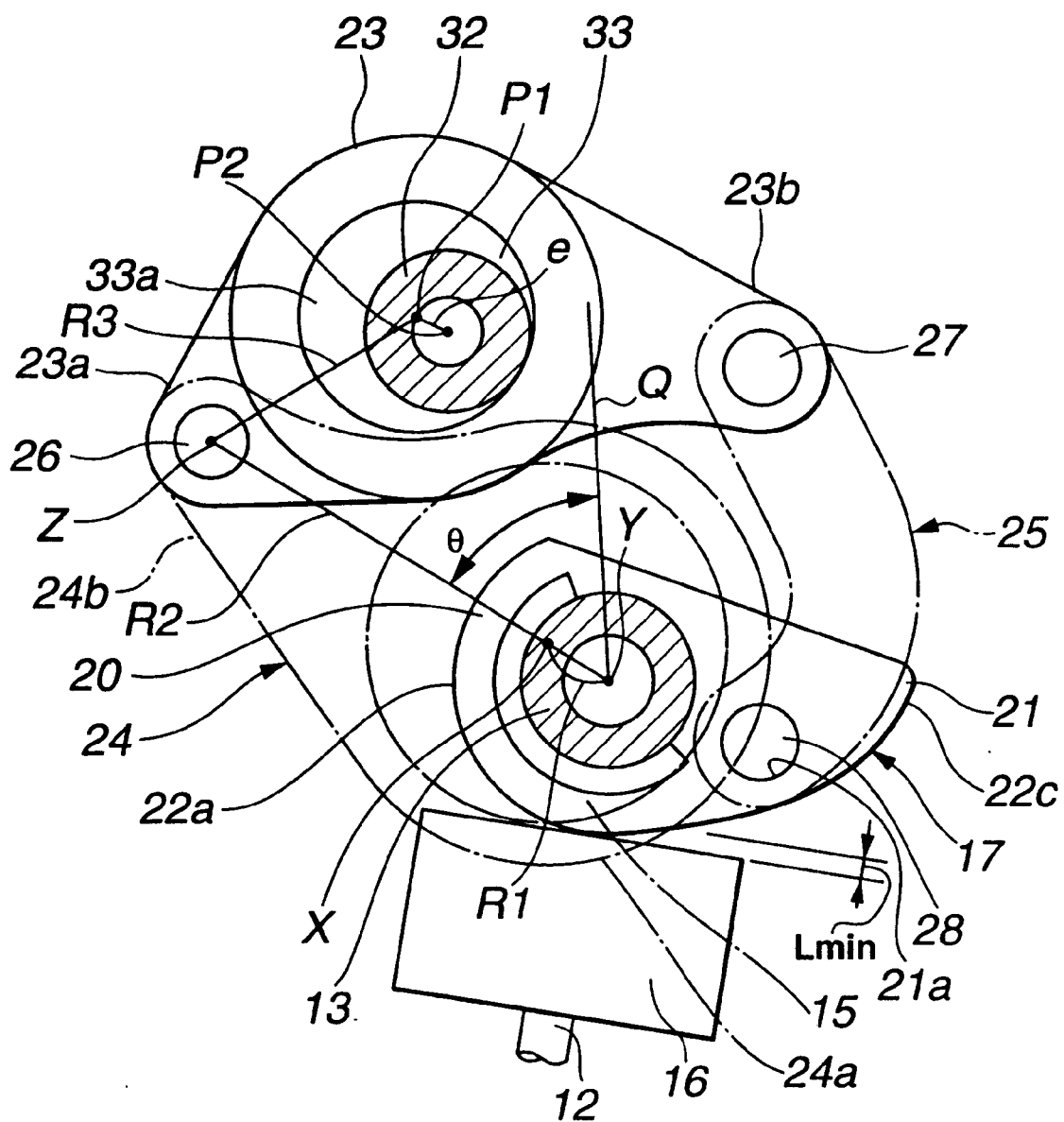
FIG. 4 is a cross-sectional view explaining the operation of minimum lift control for the first variable mechanism.
Figure 7:
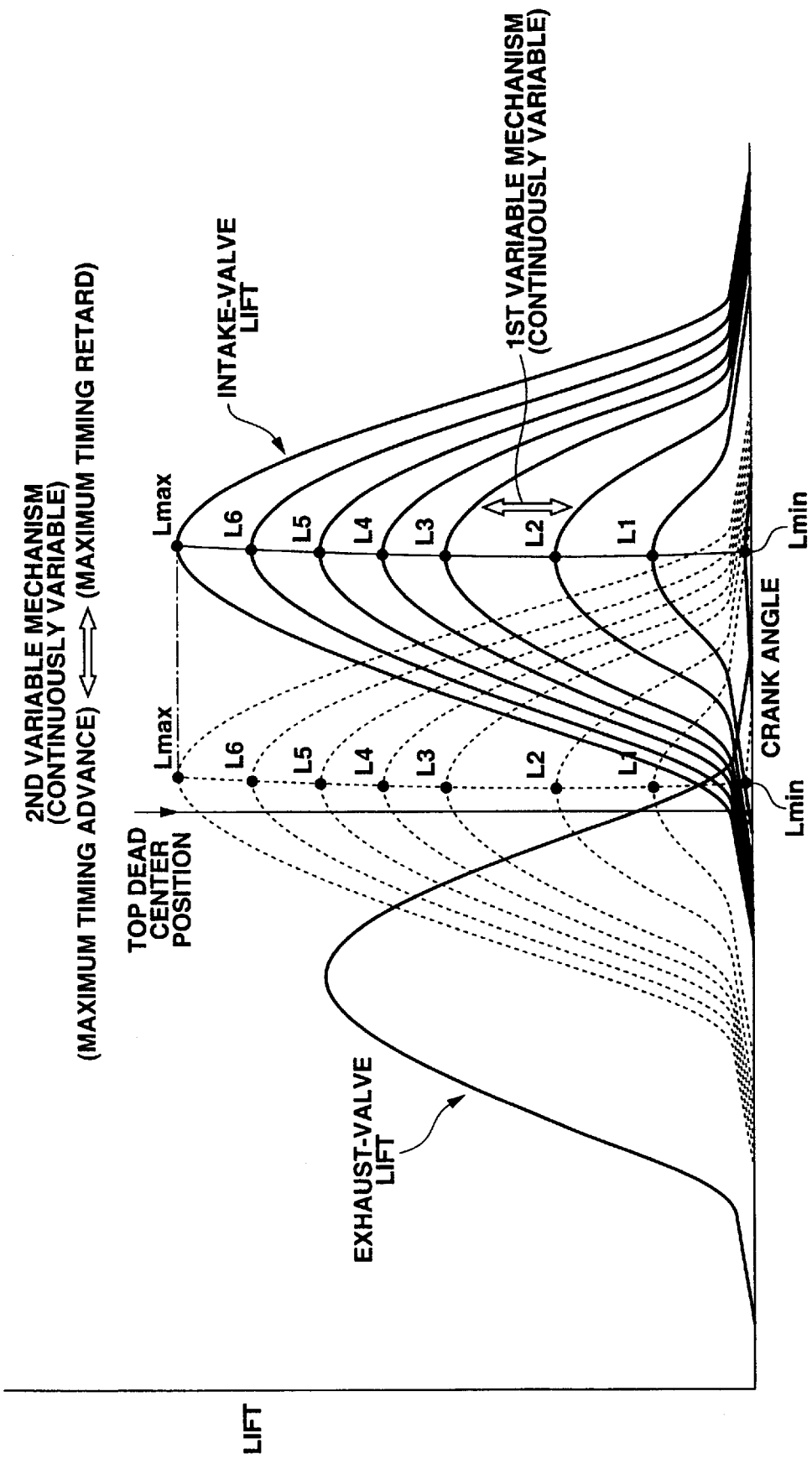
FIG. 7 is a characteristic diagram showing valve-lift characteristic curves and valve-timing characteristic curves of the system of the embodiment.

Concretely, during cranking corresponding to an initial stage of engine starting and during idling, the control shaft 32 is rotated and controlled in one direction by the electric motor 34 driven by the control signal from the controller 37. As shown in FIG. 4, the axis P1 of the control cam 33 moves away from the axis P2 of the control shaft 32 and is held at a leftward, upward rotational position, and therefore a thick-walled portion 33a rotates and moves upwards away from the drive shaft 13. As a result, the rocker arm 23 moves upwards with respect to the drive shaft 13. Thus, each of the oscillating cams 17 is forcibly pulled up through the link rod 25, and thus rotates in the counterclockwise direction. Therefore, when rotational movement of the drive cam 15 pushes up one end 23a of the rocker arm 23 through the link arm 24, its lift is transmitted through the link rod 25 to the oscillating cam 17 and to the valve lifter 16. As shown in FIGS. 4 and 7, this lift L becomes small. For this reason, gas flow can be strengthened and thus combustion can be improved. As a result of this, fuel economy can be improved and the engine rotation can be stabilized.

In particular, during engine cranking, as can be seen from FIG. 7, the valve lift is set to a minimum lift (L min) substantially corresponding to a substantially zero-lift position. As described later, it is possible to smoothly rise the engine speed.

Figure 6:
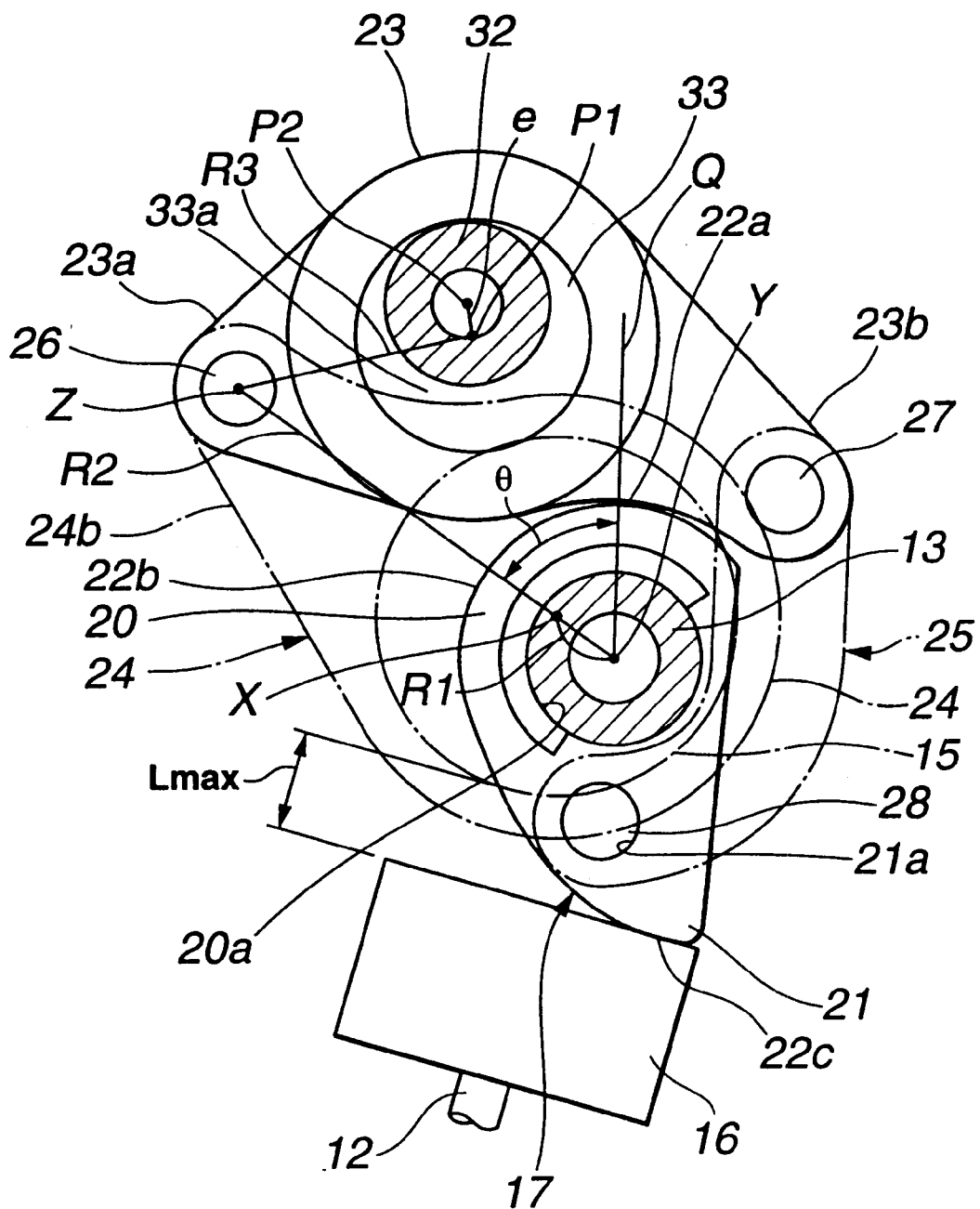
FIG. 6 is a cross-sectional view explaining the operation of maximum lift control for the first variable mechanism.

On the other hand, in a high engine-speed range, the electric motor 34 is rotated by the control signal from the controller 37, and thus the control shaft 32 is rotated in the other rotational direction by the electric motor. Such rotation of the control shaft rotates the control cam 33 in a position indicated in FIGS. 2 and 6, and then the thick-walled portion 33a is rotated downwards. Thus, the rocker arm 23 moves in the direction of the drive shaft 13, (that is, in the downward direction), and the other end 23b pushes down the oscillating cam 17 via the link arm 25. As a result, the oscillating cam 17 rotates a predetermined amount to an indicated position (in the clockwise direction). Therefore, the drive cam 15 rotates so as to push up one end 23a of the rocker arm 23 via the link arm 24. As a result, its lift is transmitted through the link rod 25 to the oscillating cam 17 and to the valve lifter 16. As shown in FIG. 6, the lift L becomes greatest (the maximum lift L max). A change in lift ranging from the minimum lift (L min) to the maximum lift (L max) is determined depending on the rotational position of the control cam 33, as can be seen from the characteristic curves (L1–L6) indicated in FIG. 7. In FIG. 7, a lift denoted by L min represents a minimum lift corresponding to a zero lift. However, assuming that the control shaft is further rotated in the one direction as previously discussed, the value L min can be set at zero.

On the other hand, as regards a side of the fluid-passage directional control valve 56, in the same manner as discussed, a desired timing advancement of the intake valve 12 is determined on the basis of the information signals from the respective sensors. The fluid-passage directional control valve 56 is switched in response to a control signal representative of the desired timing advancement in a manner so as to intercommunicate the first hydraulic pressure passage 54 and the main gallery 53 for a predetermined time interval, and also to intercommunicate the second hydraulic pressure passage 55 and the drain passage 57 for a predetermined time interval. Thereby, the relative rotational position between the timing sprocket 40 and the drive shaft 13 is changed through the ring gear 43, so that the valve timing of the intake valve is controlled to a timing-advance position. Also, the actual relative rotational position of the drive shaft 13 is monitored by the second position detection sensor 59, so that the drive shaft is rotated and brought closer to the desired relative rotational position, that is, the desired timing advancement by way of feedback control.

Concretely, until the predetermined time period has expired from engine starting, that is, until the oil temperature has reached the predetermined temperature value To, hydraulic pressure is supplied into only the second hydraulic pressure chamber 50 by means of the fluid-passage directional control valve 56, and hydraulic pressure is not supplied into the first hydraulic pressure chamber 49. Therefore, as can be seen from FIG. 1, the ring gear 43 is held at the maximum forward shifting position by virtue of the bias of the return spring 51, and then the drive shaft 13 is held at the rotational position corresponding to the maximum timing retardation. After this, as soon as the oil temperature exceeds the predetermined temperature value To, the fluid-passage directional control valve 56 is driven in response to the control signal from the controller 37 depending on the engine operating condition, with the result that the first hydraulic pressure passage 54 is communicated with the main gallery 53, and also a time interval during which the second hydraulic pressure passage 55 and the drain passage 57 are communicated with each other continuously varies. As a result of this, the ring gear 43 moves from its maximum forward shifting position to its maximum backward shifting position. Therefore, the valve-open and/or valve-close timing of the intake valve 12 can be variably controlled continuously from the maximum timing-retard state indicated by the solid line shown in FIG. 7 to the maximum timing-advance state indicated by the broken line shown in FIG. 7.

In a state wherein the previously-noted intake valve 12 is controlled to its maximum lift by means of the first variable mechanism 1, and simultaneously controlled to its maximum timing-retard position by means of the second variable mechanism 2, the intake valve is arranged and constructed so that there is no interference with the piston disposed in the cylinder and with the exhaust valve opposing thereto.

Figure 8:
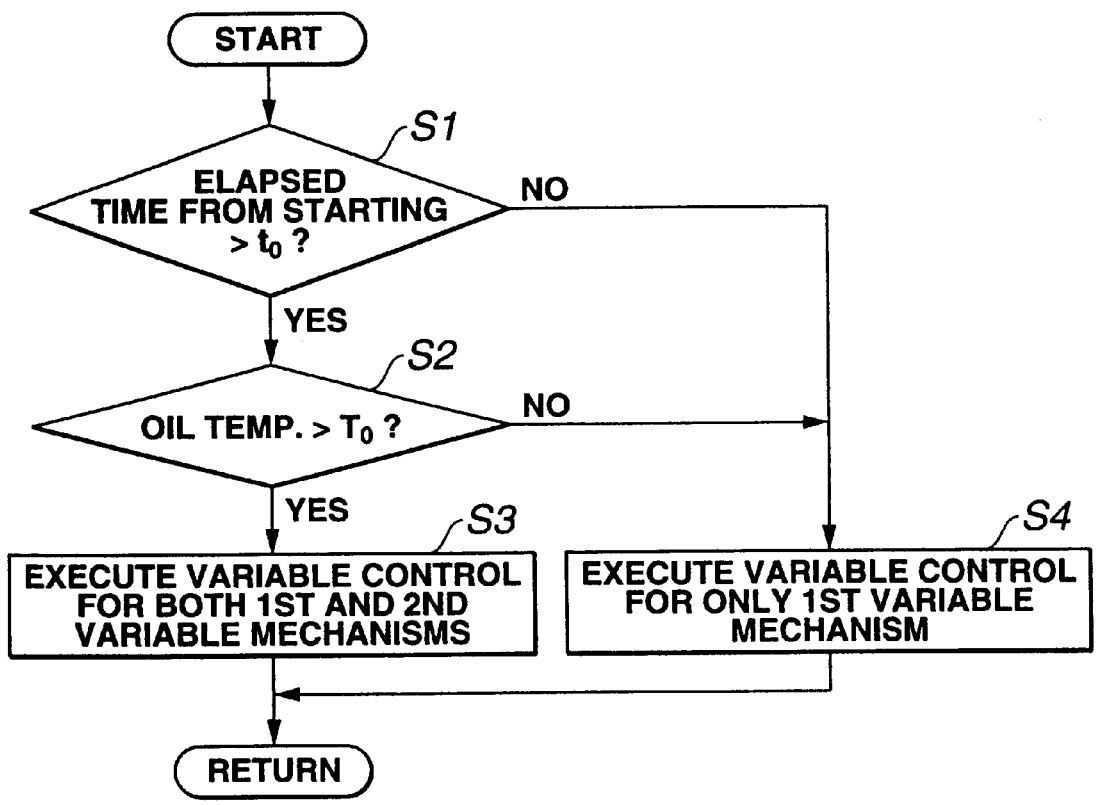
FIG. 8 is a control flow chart executed by a controller employed in the system of the embodiment.
Figure 9:
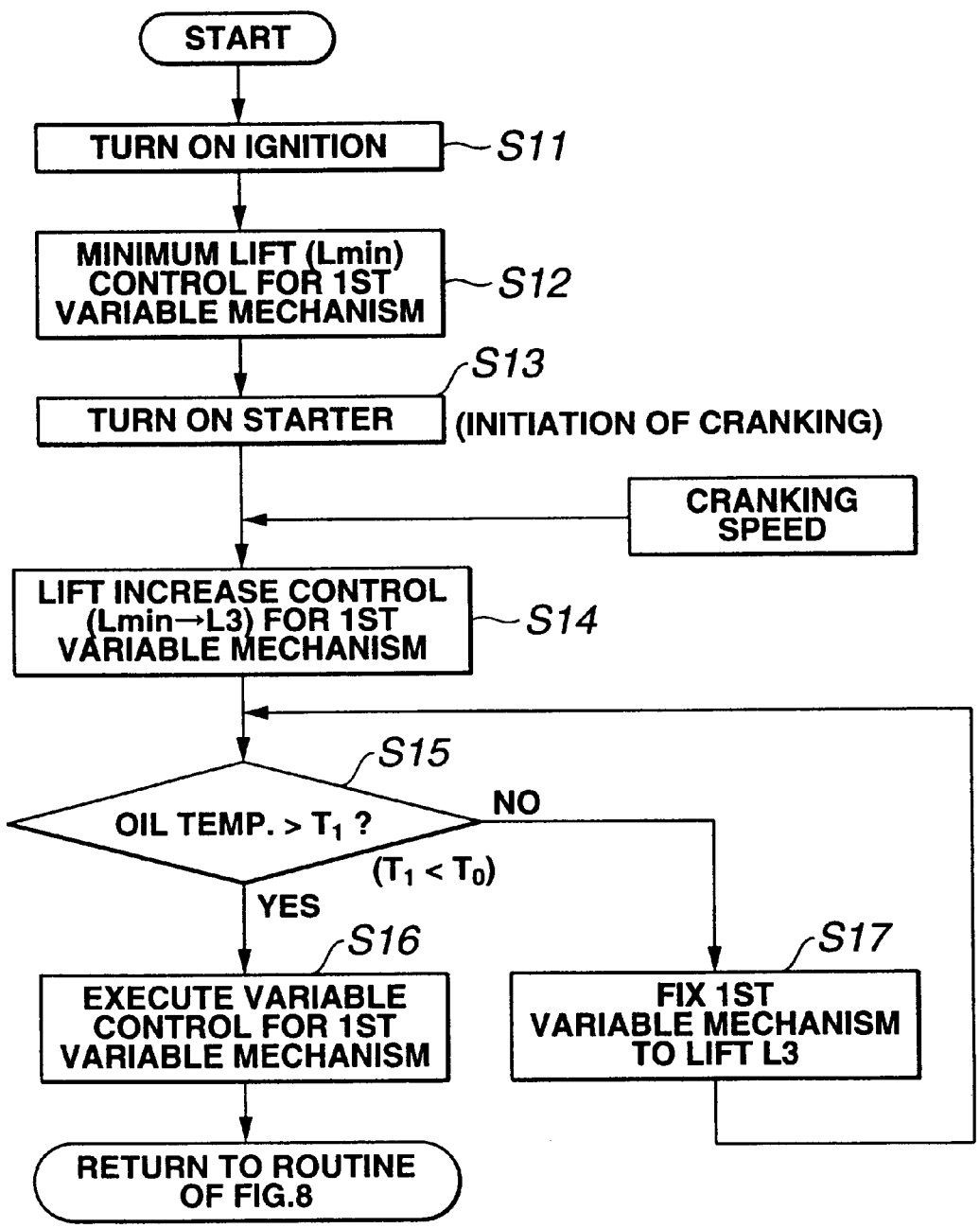
FIG. 9 is a control flow chart executed by the controller iemployed in the system of the embodiment.

Hereunder explained in detail in reference to the flow chart shown in FIGS. 8 and 9, is the concrete control necessary to drive each of the first and second variable mechanisms 1 and 2.

First of all, considering the oil temperature after engine starting, as shown in FIG. 8, at step S1, a check is made to determine whether an elapsed time counted from the engine starting exceeds the predetermined time period to based on a counted value of a timer. When exceeding the predetermined time period, the routine proceeds to step S2 in which, on the basis of information from the oil temperature sensor, a check is made to determine whether the current oil temperature exceeds the predetermined temperature value To. When exceeding the predetermined temperature value, the routine proceeds to step S3 in which both of the first and second variable mechanisms 1 and 2 are driven. Conversely, when the elapsed time does not exceed the predetermined time period to at step S1 or when the oil temperature is below the predetermined temperature value To at step S2, the routine proceeds to step S4 in which the control for the variable mechanisms is made so that only the first variable mechanism 1 is driven and the second variable mechanism 2 is not driven.

Therefore, during engine starting at low temperatures, only the valve-lift control executed by the first variable mechanism 1 is made, and the valve-timing control executed by the second variable mechanism 2 is not made, and as a result the intake valve 12 is held at the maximum timing-retard state. Accordingly, in such an operating range, there is no problem of the variable mechanism failure which may occur owing to the hydraulic energy source. Additionally, it is possible to enhance engine startability by virtue of the valve-lift control, and to enhance the engine performance. Also, after the oil temperature has risen, the second variable mechanism 2 can be driven, thus remarkably largely enhancing the engine performance.

If a failure in the electrical system of the first variable mechanism 1 occurs, there is a possibility that the control shaft 32 is affected by a reaction force created in the valve operating system, and thus an undesirable phase change occurs. However, the second variable mechanism 2 is kept at the maximum timing-retard position. Thus, even when the intake valve has reached the maximum lift owing to the phase change of the control shaft, there is no mechanical problem such as a mechanical interference between the intake valve 12 and the piston.

Hereinbelow described in reference to FIG. 9 is the control routine for the first variable mechanism 1. First, at step S11, the ignition switch is turned on. Thereafter, at step S12, the first variable mechanism 1 is controlled to the minimum lift (substantially corresponding to a substantially zero-lift position). Subsequently to the above, at step S13, the starter switch is turned on, and then engine cranking is initiated. After this, at step S14, the valve lift is controlled by means of the first variable mechanism 1, so that the lift increases up to the characteristic curve indicated by the solid line L3 shown in FIG. 7 according to an increase in engine speed (cranking speed).

Thereafter, at step S15, a check is made to determine whether the current oil temperature detected by the oil temperature sensor is higher than the predetermined temperature value (T1). When the current oil temperature is higher than the predetermined temperature value, the routine proceeds to step S16 in which the variable lift control suitable for the current engine operating condition is executed by the first variable mechanism. Conversely, when the current oil temperature is less than or equal to the predetermined temperature value T1, the routine proceeds to step S17 in which the lift control is executed by the first variable mechanism 1 so that the valve lift is fixed to the previously-discussed characteristic curve L3.

In this manner, at the initial state of engine starting (just after cranking), the valve lift is controlled to the minimum lift through step S12, and therefore the friction of the valve operating system becomes smaller. Thus, it is possible to quickly rise the engine speed.

Additionally, due to the lift-increase control achieved through step S14, the gas exchange efficiency of the air-fuel mixture can be enhanced, and thus the engine torque can rise quickly. Conjointly with the quick engine-speed rise as previously discussed, it is possible to largely improve the engine startability.

Furthermore, in case that the oil temperature is below the predetermined temperature value T1, the valve lift is fixed to a relatively low lift corresponding to the lift characteristic L3 through step S17. Thus, the flow velocity of the air-fuel mixture gas flow passing through the,intake valve 12 can be increased, thereby producing a strong gas flow in the engine cylinder. As a result, it is possible to improve combustion during cold engine starting, and thus improving fuel economy and enhancing exhaust emission control performance.

Additionally, the first variable mechanism 1 of the embodiment exhibits the valve lift characteristics shown in FIG. 7. From a study of a phase (a valve lift phase) of the drive shaft 13 at which the valve lift becomes the maximum valve lift, the system exhibits a unique valve-lift phase characteristic according to which the valve timing advances little by little as the valve lift reduces from the maximum lift L max, and thereafter when the valve lift further reduces towards the minimum lift L min the valve timing conversely retards midway. This is because, as shown in FIG. 6, a timing of the maximum valve lift corresponds to a moment that the radius vector R1 of the eccentric circle of the drive cam 15 and the line segment R2 interconnecting the axis X of the drive cam 15 and the pivot Z of the projected end 24b of the link arm 24 are aligned with each other. At this time, the direction of the radius vector R1 is offset from the vertical line Q of the cylinder head 11 by an angle θ in the valve-timing advance direction.

Figure 5:
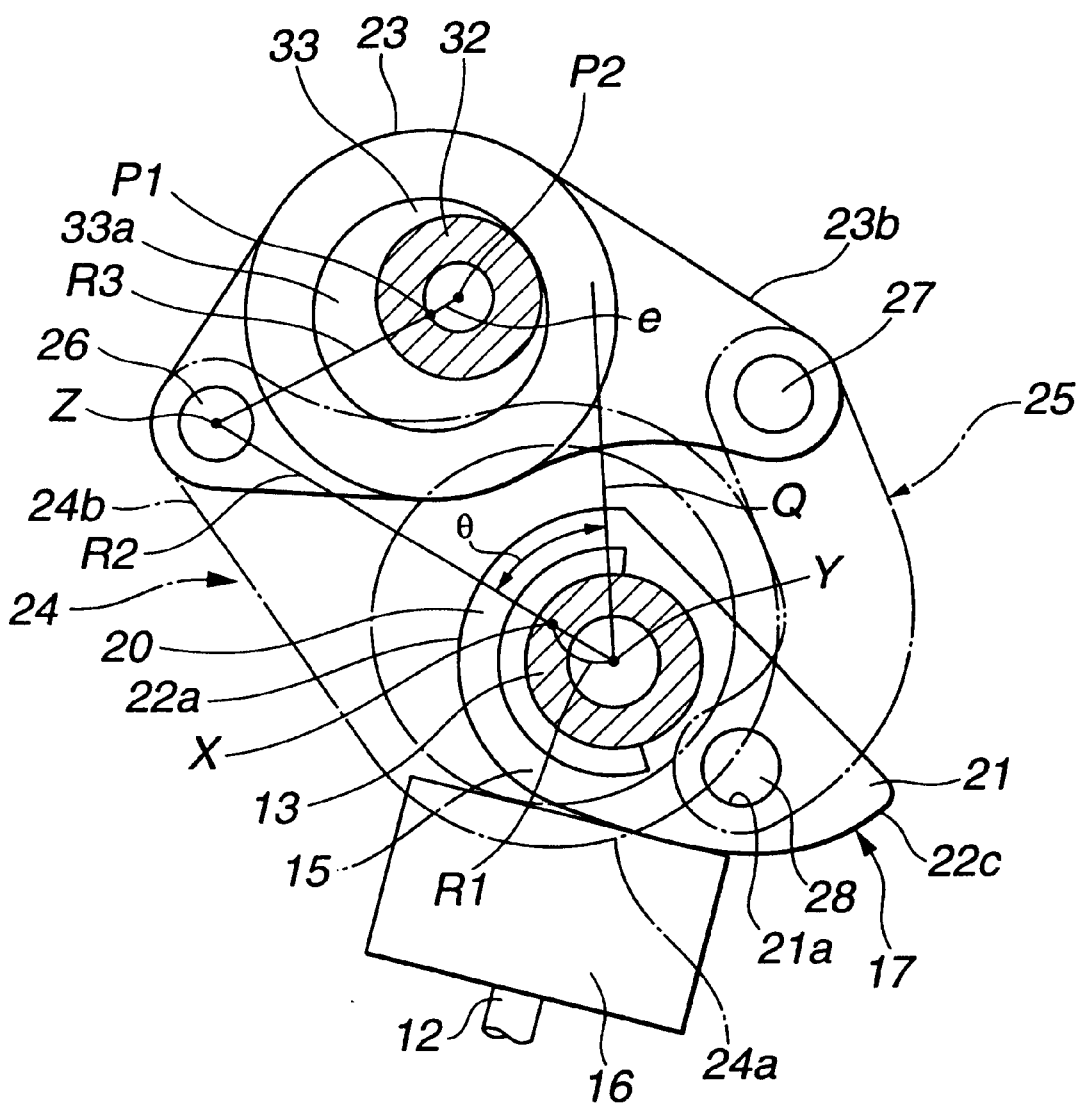
FIG. 5 is a cross-sectional view showing a control process from the maximum lift of the first variable mechanism to the minimum lift.

Next, as viewed from a case where the control shaft 32 rotates in the clockwise direction (viewing the drawing), and then the radius vector R1 of the drive cam 15 and the link arm 24 are aligned with each other. That is, at this time, the angle θ gradually increases as the control shaft 32 rotates in the clockwise direction, and then becomes maximum when the radius vector R3 of the rocker arm 23 and the radius vector e of the control cam 33 are aligned with each other (see FIG. 5), and conversely reduces (see FIG. 7) when the control shaft 32 further rotates in the clockwise direction as shown in FIG. 4. For the reasons set forth above, as a consequence, the valve-lift phase varies according to the unique characteristic.

Figure 10:
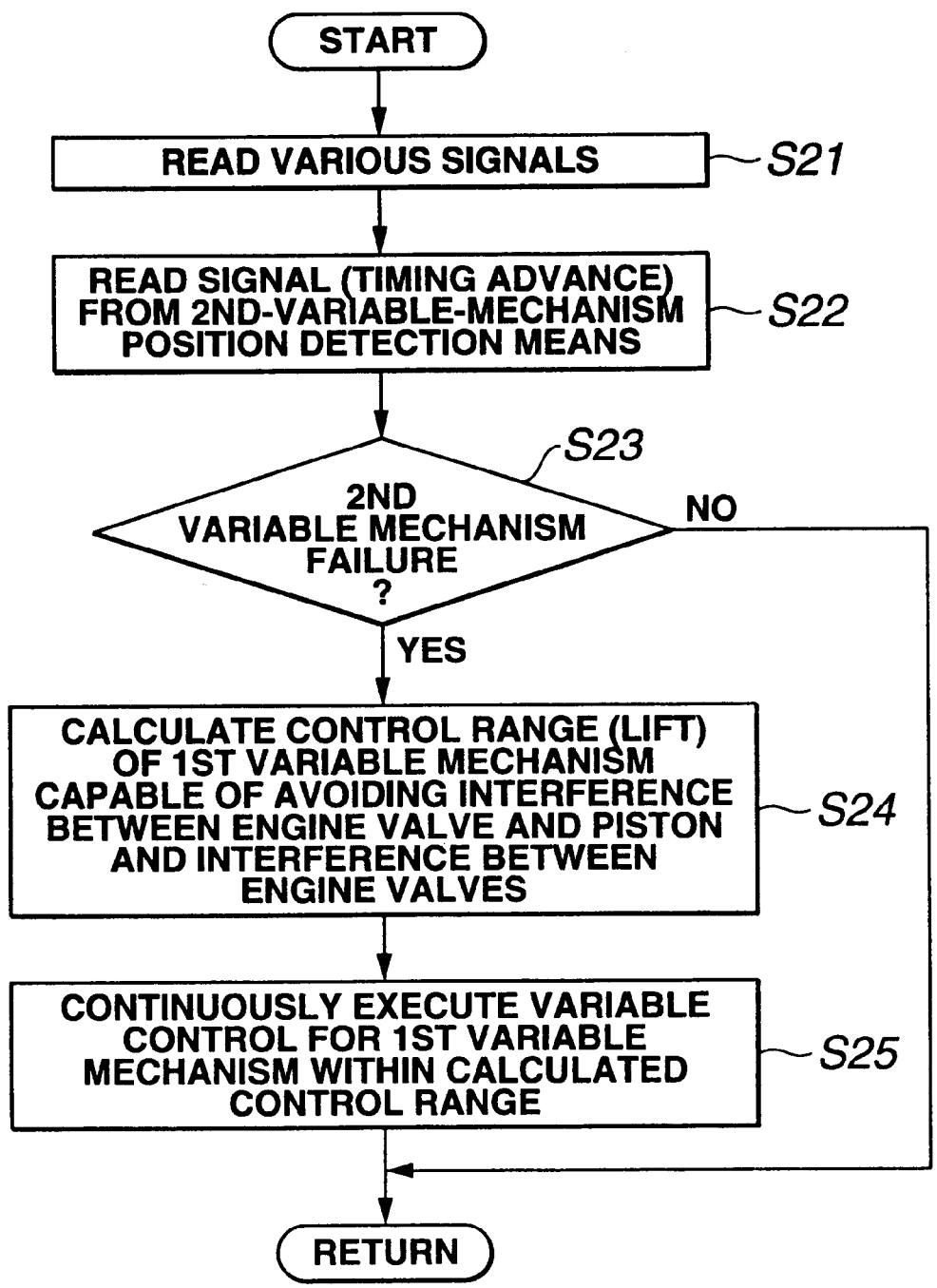
FIG. 10 is a control flow chart executed by the controller employed in the system of the embodiment.
Figure 11:
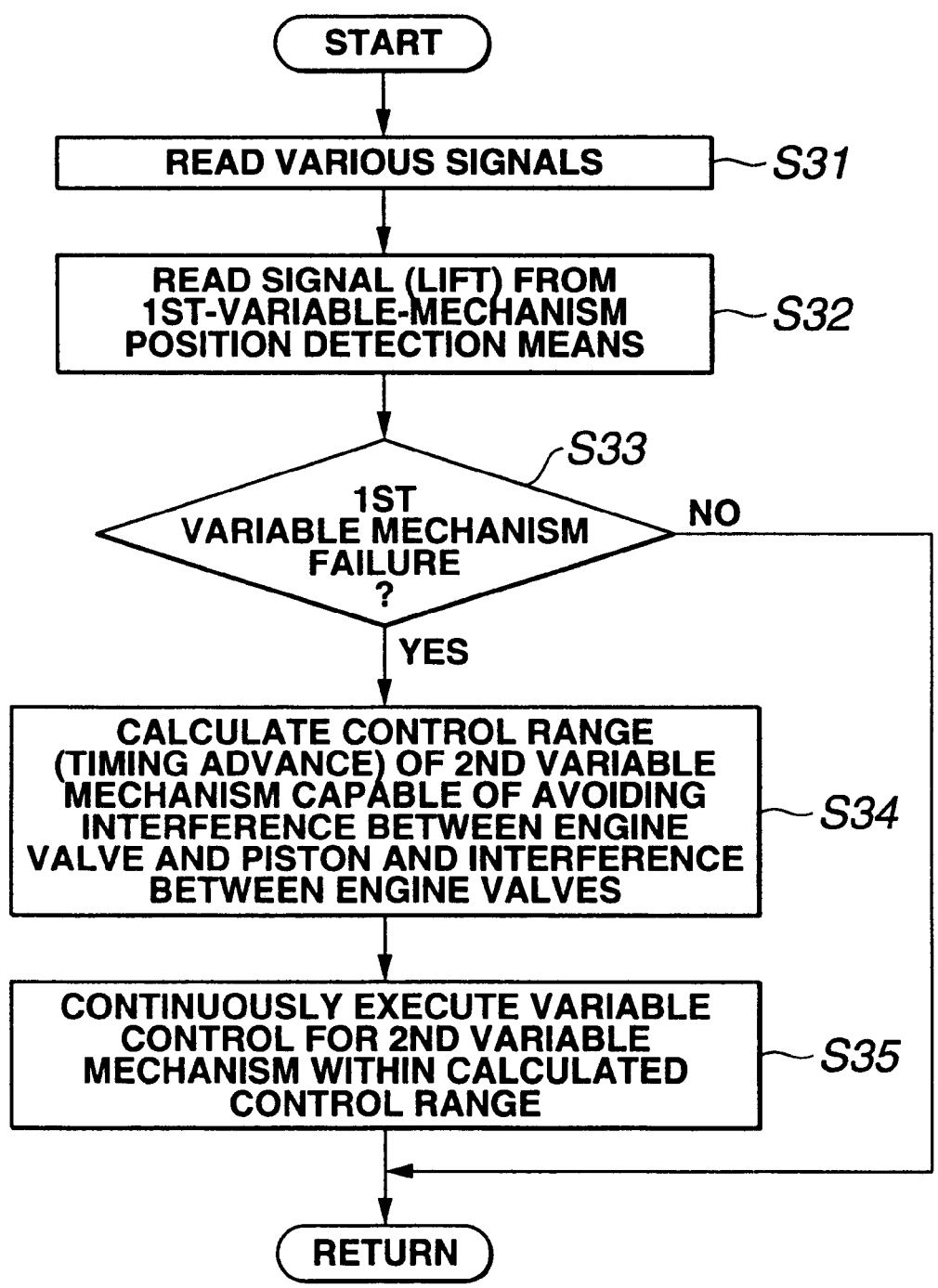
FIG. 11 is a control flow charttexecuted by the controller employed in the system of the embodiment.

Additionally, the controller 37 performs control routines shown in FIGS. 10 and 11 by means of the control circuit when the first variable mechanism or the second variable mechanism fails in the operating range in which the first and second variable mechanisms are both variably controlled.

According to the control routine shown in FIG. 10, first of all, at step S31, information from each of the sensors is read. At step S32, the actual rotational position (corresponding to a lift) of the control shaft 32 is read on the basis of information from the first position detection sensor 58. Thereafter, at step S33, a check is made to determine whether the first variable mechanism 1 fails, by way of comparison between the actual rotational position and the desired rotational position. When the first variable mechanism failure is determined, the routine proceeds to step S34 in which a controlled position for the second variable mechanism, that is, a control range (a timing advancement) in which there is no interference between the intake valve 12 and the piston and there is no interference between the intake valve 12 and the exhaust valve, is arithmetically calculated. Furthermore, at step S35, the second variable mechanism 2 is continuously controlled within the predetermined control range.

That is, in the case that the first variable mechanism 1 fails during the maximum lift (L max) control, the second variable mechanism 2 is continuously controlled in the vicinity of the maximum timing-retard position in order to avoid the interference between both of the engine valves. Also, in the case that the first variable mechanism fails in the small lift range (L min through L1) the second variable mechanism 2 is continuously controlled in a wide range extending from the maximum timing retard position to the maximum timing advance position. As a result of this, it is possible to suppress the engine performance from being deteriorated. Furthermore, in the case that the first variable mechanism fails in the middle lift (L3) range, the second variable mechanism is continuously controlled in a range extending from the maximum timing retard position to the middle phase.

As discussed above, the second variable mechanism 2 can be continuously controlled within the control range capable of avoiding the interference between each of the engine valves and the piston, and thus it is possible to prevent the engine performance from lowering.

According to the control routine shown in FIG. 11, at step S21, information from each of the sensors is read. Thereafter, at step S22, the actual relative rotational position (corresponding to a timing advancement) of the drive shaft 13 is read on the basis of information from the second position detection sensor 59. Thereafter, at step S23, a check is made to determine whether the second variable mechanism 2 fails, by way of comparison between the actual relative rotational position and the desired relative rotational position.

When the second variable mechanism failure is determined the routine proceeds to step S24 in which a controlled position for the first variable mechanism, that is, a control range (a lift) in which there is no interference between the intake valve 12 and the piston and there is no interference between the intake valve 12 and the exhaust valve, is arithmetically calculated. Furthermore, at step S25, the first variable mechanism 1 is continuously controlled within the predetermined control range.

That is, in the case that the second variable mechanism 2 fails during the maximum timing advance control, the first variable mechanism 1 is continuously controlled in the small lift range (L min through L1) shown in FIG. 7 in order to avoid the interference. In the case that the second variable mechanism fails in the maximum timing retard side, there is no problem of the interference and thus the first variable mechanism is continuously controlled in the entire range extending from the minimum lift to the maximum lift. Furthermore, in the case that the second variable mechanism fails within the middle phase, the first variable mechanism is continuously controlled in a range extending from the minimum lift to the middle lift L3.

As discussed above, even when the second variable mechanism 2 fails, the first variable mechanism 1 can be continuously controlled within the control range capable of avoiding the interference between the intake valve 12 and the piston, and thus it is possible to suppress the engine performance from lowering, as much as possible. Furthermore, when the second variable mechanism fails in the middle phase, the first variable mechanism can be continuously controlled within the control range extending from the minimum lift to the middle lift L3.

As discussed above, even when the second variable mechanism 2 fails, the first variable mechanism 1 can be continuously controlled within the control range capable of avoiding the interference between the intake valve 12 and the piston, and thus it is possible to go suppress the engine performance from lowering, as much as possible. Also it is possible to provide the same effects by continuously controlling the first variable mechanism in a multi-stage fashion. In this case, the control can be simplified.

Additionally, according to the system of the present embodiment, the oscillating cam 17 is linked to the rocker arm 23 via the link rod 25, and thus the maximum range of oscillating motion of the oscillating cam 17 can be regulated within the oscillating motion range of the rocker arm 23 by means of the link rod 25. Therefore, even in the high engine-speed range, it is possible to certainly prevent a jumping phenomena, such as excessive oscillation and excessive jumping motion of the oscillating cam 17. Therefore, it is possible to avoid collision between the oscillating cam 17 and the rocker arm 23,,occurring due to movement of the oscillating cam into and out of contact with the rocker arm, thus preventing occurrence of hammering noise, and also preventing the accuracy of valve-lift control from lowering. In particular, in the high engine speed range, it is possible to stabilize the engine performance.

Moreover, although in the system of the present embodiment the valve-lift phase uniquely changes according to a change in valve lift, it is possible to correct the unique changes in the valve-lift phase by combining the first variable mechanism 1 with the second variable mechanism 2 capable of varying the rotational phase of the drive shaft 13. That is to say, under the engine operating condition kept is a high engine-speed range or a high engine-load range, if the valve lift is controlled to a large valve lift by means off the first variable mechanism 1 and additionally the valve-lift phase is controlled to approach to the top dead center, a valve overlap can be adjusted to a greater value. Thus, it is possible to scavenge the residual gas prevailing in the engine cylinder by synchronizing a negative pressure wave of exhaust pulse with the greater valve overlap period, thereby enhancing the charging efficiency of fresh air. As a consequence, it is possible to greatly enhance the engine power output.

While the foregoing is a description of the preferred embodiments carried out the invention, it will be understood that the invention is not limited to the particular embodiments shown and described herein, but that various changes and modifications may be made without departing from the scope or spirit of this invention as defined by the following claims.

INDUSTRIAL APPLICABILITY

As discussed above, the present invention is not limited to the embodiments shown and described herein, but it will be appreciated that the concept of the invention can be applied to the exhaust valve side. In the same manner as the intake valve 12, it is possible to reduce a friction of an operated engine valve by controlling the first variable mechanism 1 to the minimum lift substantially corresponding to a substantially zero-lift position at the initial stage of engine starting. Thus, it is possible to ensure a smooth engine-speed rise characteristic. Furthermore, it is possible to enhance the gas exchange efficiency by variably controlling the valve lift according to the increase in engine speed, thus ensuring a good startability. As discussed above, it is possible to provide the same effects as the intake valve side.

In this manner, in the case that the concept of the invention is applied to the exhaust valve side, if either one of the variable mechanisms fails, it is possible to properly control the other variable mechanism in the same manner as the intake valve side. As a matter of course, it is possible to prevent the engine performance from lowering, while avoiding the mechanical problem as described previously.

Additionally, in the system of the invention as recited in claims 5 through 8, the energy source for each of the variable mechanisms is not limited to hydraulic pressure or to electrical power. In lieu thereof power source may be used. Also, the concept of the invention may be applied to a system in which both of variable mechanisms are driven electrically or hydraulically.

What is claimed is:

1. A variable valve operating system of an internal combustion engine comprising:
   a first variable mechanism capable of variably controlling at least a lift characteristic of one of engine valves including intake and exhaust valves depending on an engine operating condition;
   a second variable mechanism capable of variably controlling at least one of a valve-open and valve-close timing characteristic of the one engine valve depending on the engine operating condition;
   a position detector for detecting current actuated positions of the first and second variable mechanisms; and
   a controller being responsive to a failure position of one of the first and second variable mechanisms, detected by the position detector, for controlling movement of the other variable mechanism within a predetermined range that avoids interference between the engine valve and a piston and interference between the intake and exhaust valves when the one variable mechanism fails.

2. The variable valve operating system as claimed in claim 1, wherein the controller is responsive to a failure position of the second variable mechanism, detected by the position detector, for controlling movement of the first variable mechanism within the predetermined range when the second variable mechanism fails.

3. The variable valve operating system as claimed in claim 1, wherein the controller is responsive to a failure position of the first variable mechanism, detected by the position detector, for controlling movement of the second variable mechanism within the predetermined range when the first variable mechanism fails.

4. The variable valve operating system as claimed in claim 1, wherein the controller continuously controls the movement of the other variable mechanism with the predetermined range in response to the failure position of the one variable mechanism.

5. The variable valve operating system as claimed in claim 1, wherein the intake valve of the engine valves is arranged so that there is no interference with the piston disposed in a cylinder and with the exhaust valve opposing to the intake valve, in a state wherein the intake valve is controlled to its maximum lift by means of the first variable mechanism and simultaneously controlled to its maximum timing-retard position by means of the second variable mechanism.

6. The variable valve operating system as claimed in claim 1, wherein the second variable mechanism is controlled so that the intake valve is held at its maximum timing-retard position during engine starting at low temperatures.

7. The variable valve operating system as claimed in claim 1, wherein the position detector comprises a first position detection sensor that detects the current actuated position of the first variable mechanism and a second position detection sensor that detects the current actuated position of the second variable mechanism.

8. The variable valve operating system as claimed in claim 7, wherein the controller calculates, based on signal values from the first and second position detection sensors, the predetermined range that results in no interference with the piston disposed in a cylinder and with the exhaust valve opposing to the intake valve.

9. A variable valve operating system of an internal combustion engine comprising:

a first variable mechanism capable of variably controlling at least a lift characteristic of one of engine valves including intake and exhaust valves depending on an engine operating condition;

a second variable mechanism capable of variably controlling at least one of a valve-open and valve-close timing characteristic of the one engine valve depending on the engine operating condition;

a position detecting means for detecting current actuated positions of the first and second variable mechanisms; and a control means being responsive to a failure position of one of the first and second variable mechanisms, detected by the position detecting means, for controlling movement of the other variable mechanism within a predetermined range that avoids interference between the engine valve and a piston and interference between the intake and exhaust valves when the one variable mechanism fails.

10. A variable valve operating system of an internal combustion engine comprising:

a first variable mechanism capable of variably controlling at least a lift characteristic of an engine valve depending on an engine operating conditions;

a second variable mechanism capable of variably controlling at least one of a valve-open and valve-close timing characteristic of the engine valve depending on the engine operating condition;

a position detection means for detecting current actuated positions of the first and second variable mechanisms; and a control means being responsive to a failure position of one of the first and second variable mechanisms, detected by the position detection means, for controlling movement of the other variable mechanism within a predetermined range when the one variable mechanism fails, wherein the first variable mechanism comprises a drive shaft having a drive cam formed on an outer periphery thereof, and an oscillating cam being oscillatingly supported on a pivot and acting to open and close the engine valve by way of oscillating motion thereof, and a rocker arm rotatably linked at one end to the drive cam and rotatably linked at the other end to the oscillating cam, and a center of the oscillating motion of the rocker arm being variably controlled by means of a control cam.

11. A variable valve operating system of an internal combustion engine comprising:

a first variable mechanism capable of variably controlling at least a lift characteristic of an engine valve depending on an engine operating condition;

a second variable mechanism capable of variably controlling at least one of a valve-open and valve-close timing characteristic of the engine valve depending on the engine operating condition;

a position detection means for detecting current actuated positions of the first and second variable mechanisms; and a control means being responsive to a failure position of one of the first and second variable mechanisms, detected by the position detection means, for controlling movement of the other variable mechanism within a predetermined range when the one variable mechanism fails, wherein the first variable mechanism comprises a drive shaft having a drive cam formed on an outer periphery thereof, a link arm rotatably at one end linked to an outer periphery of the drive cam, a rocker arm rotatably linked at one end to the other end of the link arm, and a center of oscillating motion of the rocker arm being variably controlled by means of a control cam, an oscillating cam acting to open and close the engine valve, a link member mechanically and rotatably linking the oscillating cam to the other end of the rocker arm and limiting a maximum range of oscillating motion of the oscillating cam within range of the oscillating motion of the rocker arm, and an electric actuator controlling a rotational position of the control cam by rotating the control cam by means of a control shaft responsively to the engine operating condition.

12. A variable valve operating system of an internal combustion engine comprising:

a first variable mechanism capable of variably controlling at least a lift characteristic of an engine valve depending on an engine operating condition;

a second variable mechanism capable of variably controlling at least one of a valve-open and valve-close timing characteristic of the engine valve depending on the engine operating condition;

a position detection means for detecting a current actuated position of the second variable mechanism; and a control means being responsive to a failure position of the second variable mechanism, detected by the position detection means, for controlling movement of the first variable mechanism within a predetermined range when the second variable mechanism fails, wherein the first variable mechanism comprises a drive shaft having a drive cam formed on an outer periphery thereof, and an oscillating cam being oscillatingly supported on a pivot and acting to open and close the engine valve by way of oscillating motion thereof, and a rocker arm rotatably linked at one end to the drive cam and rotatably linked at the other end to the oscillating cam, and a center of the oscillating motion of the rocker arm being variably controlled by means of a control cam.

13. A variable valve operating system of an internal combustion engine comprising:
- a first variable mechanism capable of variably controlling at least a lift characteristic of an engine valve depending on an engine operating condition;
- a second variable mechanism capable of variably controlling at least one of a valve-open and valve-close timing characteristic of the engine valve depending on the engine operating condition;
- a position detection means for detecting a current actuated position of the first variable mechanism; and
- a control means being responsive to a failure position of the first variable mechanism, detected by the position detection means, for controlling movement of the second variable mechanism within a predetermined range when the first variable mechanism fails,
- wherein the first variable mechanism comprises a drive shaft having a drive cam formed on an outer periphery thereof, and an oscillating cam being oscillatingly supported on a pivot and acting to open and close the engine valve by way of oscillating motion thereof, and a rocker arm rotatably linked at one end to the drive cam and rotatably linked at the other end to the oscillating cam, and a center of the oscillating motion of the rocker arm being variably controlled by means of a control cam.

14. A variable valve operating system of an internal combustion engine comprising:
- a first variable mechanism capable of variably controlling at least a lift characteristic of an engine valve depending on an engine operating condition;
- a second variable mechanism capable of variably controlling at least one of a valve-open and valve-close timing characteristic of the engine valve depending on the engine operating condition;
- a position detection means for detecting a current actuated position of the second variable mechanism; and
- a control means being responsive to a failure position of the second variable mechanism, detected by the position detection means, for controlling movement of the first variable mechanism within a predetermined range when the second variable mechanism fails,
- wherein the first variable mechanism comprises a drive shaft having a drive cam formed on an outer periphery thereof, a link arm rotatably linked at one end to an outer periphery of the drive cam, a rocker arm rotatably linked at one end to the other end of the link arm, and a center of oscillating motion of the rocker arm being variably controlled by means of a control cam, an oscillating cam acting to open and close the engine valve, a link member mechanically and rotatably linking the oscillating cam to the other end of the rocker arm and limiting a maximum range of the oscillating motion of the oscillating cam within range of oscillating motion of the rocker arm, and an electric actuator controlling a rotational position of the control cam by rotating the control cam by means of a control shaft responsively to the engine operating condition.

15. A variable valve operating system of an internal combustion engine comprising:
- a first variable mechanism capable of variably controlling at least a lift characteristic of an engine valve depending on an engine operating condition;
- a second variable mechanism capable of variably controlling at least one of a valve-open and valve-close timing characteristic of the engine valve depending on the engine operating condition;
- a position detection means for detecting a current actuated position of the first variable mechanism; and
- a control means being responsive to a failure position of the first variable mechanism, detected by the position detection means, for controlling movement of the second variable mechanism within a predetermined range when the first variable mechanism fails,
- wherein the first variable mechanism comprises a drive shaft having a drive cam formed on an outer periphery thereof, a link arm rotatably linked at one end to an outer periphery of the drive cam, a rocker arm rotatably linked at one end to the other end of the link arm, and a center of oscillating motion of the rocker arm being variably controlled by means of a control cam, an oscillating cam acting to open and close the engine valve, a link member mechanically and rotatably linking the oscillating cam to the other end of the rocker arm and limiting a maximum range of oscillating motion of the oscillating cam within range of the oscillating motion of the rocker arm, and an electric actuator controlling a rotational position of the control cam by rotating the control cam by means of a control shaft responsively to the engine operating condition.

* * * * *